(12) United States Patent
Hicks

(10) Patent No.: US 7,021,052 B1
(45) Date of Patent: Apr. 4, 2006

(54) MOTORCYCLE EXHAUST CONTROL SYSTEM

(76) Inventor: Maury Hicks, 430 Straford Ave., Dixon, CA (US) 95620

( * ) Notice: Subject to any disclaimer, the term of this patent is extended or adjusted under 35 U.S.C. 154(b) by 61 days.

(21) Appl. No.: 10/651,702

(22) Filed: Aug. 29, 2003

(51) Int. Cl.
*F02B 27/02* (2006.01)

(52) U.S. Cl. ............................ 60/313; 60/312; 60/314; 60/322; 60/323; 138/128; 181/216; 181/228; 181/241

(58) Field of Classification Search ................... 60/312, 60/313, 314, 322, 323, 324; 138/128, 151, 138/156; 181/204, 215, 216, 227, 228, 241
See application file for complete search history.

(56) References Cited

U.S. PATENT DOCUMENTS

| | | | |
|---|---|---|---|
| 4,142,366 A | * | 3/1979 | Tanahashi et al. ............. 60/322 |
| 4,656,712 A | * | 4/1987 | Harwood et al. ......... 29/890.08 |
| 4,953,352 A | * | 9/1990 | Campbell ..................... 60/313 |
| 5,727,599 A | * | 3/1998 | Fisher et al. ................. 138/156 |
| 5,784,881 A | * | 7/1998 | Otsuka et al. ................ 60/322 |
| 5,901,754 A | * | 5/1999 | Elsasser et al. ............. 138/118 |
| 6,409,606 B1 | * | 6/2002 | Nakajima et al. ........... 464/181 |

FOREIGN PATENT DOCUMENTS

GB 2159597 A * 12/1985 ................. 138/128

\* cited by examiner

*Primary Examiner*—Binh Q. Tran

(57) ABSTRACT

A motorcycle exhaust control system for covering exhaust cross-over pipes is comprised of an elongate tubular crossover block-off member having a side wall. The crossover block-off member side wall has a slit extending the length thereof. The crossover block-off member forms the springed structure capable of placement in a motorcycle exhaust pipe. The crossover block-off member is capable of self-detainment in the motorcycle exhaust pipe. The crossover block-off member is capable of blocking the motorcycle exhaust pipe crossover.

1 Claim, 2 Drawing Sheets

MOTORCYCLE EXHAUST CONTROL SYSTEM

BACKGROUND OF THE INVENTION

1. Field of the Invention

The present invention relates to a motorcycle exhaust control system for use in connection with exhaust control devices. The motorcycle exhaust control system has particular utility in connection with springed tubular motorcycle exhaust control system capable of positioning and self detainment in a motorcycle exhaust pipe.

2. Description of the Prior Art

Motorcycle exhaust control systems are desirable for modifying the power curve of an internal combustion engine. Many current motorcycles have a crossover pipe which sacrifices some low end torque for high end horsepower. A need was felt for a simple, removable device for blocking this exhaust crossover so as to increase low end torque.

The use of exhaust control devices is known in the prior art. For example, U.S. Pat. No. 5,018,349 to Pemberton discloses an exhaust efficiency increasing apparatus incorporating crossover ducts between dual exhaust conduits extending from an engine having two cylinder banks. The ducts are disposed to communicate with upstream entry and downstream exit apertures on the exhaust conduits and cross in an "X". Since where the ducts are positioned affects engine torque, torque curves can be adjusted or changed by adjustably positioning the crossover ducts within a housing which is placed in the exhaust system, to move the crossover ducts nearer to or further from the engine, by computer or manual control. A second embodiment incorporates at least two spaced duct pairs disposed to increase low end torque and high end output. However, the Pemberton '349 patent does not have an elongate tubular element having a slit extending along the side wall thereof for forming a springed structure capable of positionment and self detainment within a motorcycle exhaust pipe for forming an exhaust crossover block off member.

Similarly, U.S. Pat. No. 5,199,258 to Barth discloses an adjustable torque exhaust control system is described as incorporating a collector having pipes of inside diameter slightly greater than the outside diameter of the pipes exiting from the engine heads which are coupled to it. This permits a removable insertion of one set of pipes into the other, for ease of installation and later servicing of the engine and vehicle, and allows for a sliding of the collector towards, or away from, the engine as desired, to controllably adjust available torque and/or horsepower. In a preferred embodiment of the invention, the lengths for the collector pipes are individually selected so as to equalize the total lengths of all pipes from the engine cylinders to the output end of the collector. However, the Barth '258 patent does not have an elongate tubular element having a slit extending along the side wall thereof for forming a springed structure capable of positionment and self detainment within a motorcycle exhaust pipe for forming an exhaust crossover block off member.

Lastly, U.S. Pat. No. Des. 420,316 to Hanlon et al. discloses a motorcycle muffler that has an enlarged medial portion connectable to a motorcycle exhaust pipe. However, the Hanlon et al. '316 patent does not have an elongate tubular element having a slit extending along the side wall thereof for forming a springed structure capable of positionment and self detainment within a motorcycle exhaust pipe for forming an exhaust crossover block off member. While the above-described devices fulfill their respective, particular objectives and requirements, the aforementioned patents do not describe a motorcycle exhaust control system that allows springed tubular motorcycle exhaust control system capable of positioning and self detainment in a motorcycle exhaust pipe. The Pemberton '349, Barth '258 and Hanlon et al. '316 patents make no provision for an elongate tubular element having a slit extending along the side wall thereof for forming a springed structure capable of positionment and self detainment within a motorcycle exhaust pipe for forming an exhaust crossover block off member.

Therefore, a need exists for a new and improved motorcycle exhaust control system which can be used for springed tubular motorcycle exhaust control system capable of positioning and self detainment in a motorcycle exhaust pipe. In this regard, the present invention substantially fulfills this need. In this respect, the motorcycle exhaust control system according to the present invention substantially departs from the conventional concepts and designs of the prior art, and in doing so provides an apparatus primarily developed for the purpose of springed tubular motorcycle exhaust control system capable of positioning and self detainment in a motorcycle exhaust pipe.

SUMMARY OF THE INVENTION

In view of the foregoing disadvantages inherent in the known types of exhaust control devices now present in the prior art, the present invention provides an improved motorcycle exhaust control system, and overcomes the above-mentioned disadvantages and drawbacks of the prior art. As such, the general purpose of the present invention, which will be described subsequently in greater detail, is to provide a new and improved motorcycle exhaust control system and method which has all the advantages of the prior art mentioned heretofore and many novel features that result in a motorcycle exhaust control system which is not anticipated, rendered obvious, suggested, or even implied by the prior art, either alone or in any combination thereof.

To attain this, the present invention essentially comprises an elongate tubular crossover block-off member having a side wall. The crossover block-off member side wall has a slit extending the length thereof. The crossover block-off member forms the springed structure capable of placement in a motorcycle exhaust pipe. The crossover block-off member is capable of self detainment in the motorcycle exhaust pipe. The crossover block-off member is capable of blocking the motorcycle exhaust pipe crossover.

There has thus been outlined, rather broadly, the more important features of the invention in order that the detailed description thereof that follows may be better understood and in order that the present contribution to the art may be better appreciated.

The invention may also be comprised of spring steel, mild steel, stainless steel, chrom plated steel and stainless steel. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motorcycle exhaust control system that has all of the advantages of the prior art exhaust control devices and none of the disadvantages.

It is another object of the present invention to provide a new and improved motorcycle exhaust control system that may be easily and efficiently manufactured and marketed.

An even further object of the present invention is to provide a new and improved motorcycle exhaust control system that has a low cost of manufacture with regard to both materials and labor, and which accordingly is then susceptible of low prices of sale to the consuming public, thereby making such motorcycle exhaust control system economically available to the buying public.

Still another object of the present invention is to provide a new motorcycle exhaust control system that provides in the apparatuses and methods of the prior art some of the advantages thereof, while simultaneously overcoming some of the disadvantages normally associated therewith.

Lastly, it is an object of the present invention is to provide a motorcycle exhaust control system for springed tubular motorcycle exhaust control system capable of positioning and self detainment in a motorcycle exhaust pipe.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
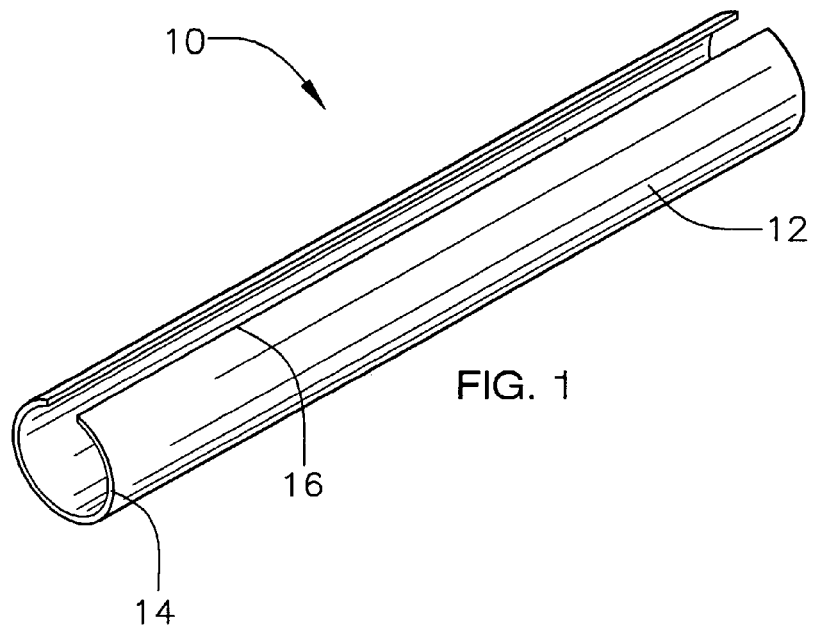
FIG. 1 is a top perspective view of the preferred embodiment of the motorcycle exhaust control system constructed in accordance with the principles of the present invention.

Referring now to the drawings, and particularly to FIGS. 1–4, a preferred embodiment of the motorcycle exhaust control system of the present invention is shown and generally designated by the reference numeral 10.

In FIG. 1, a new and improved motorcycle exhaust control system 10 of the present invention for springed tubular motorcycle exhaust control system capable of positioning and self detainment in the motorcycle exhaust pipe is illustrated and will be described. More particularly, the motorcycle exhaust control system 10 has an elongate tubular crossover block-off member 12. The crossover block-off member 12 has a side wall 14. The crossover block-off member side wall 14 has a slit 16 extending the length thereof. The crossover block-off member 12 forms the springed structure capable of placement in a motorcycle exhaust pipe 18. The crossover block-off member 12 is capable of self detainment in the motorcycle exhaust pipe 18. The crossover block-off member 12 is capable of blocking a motorcycle exhaust pipe crossover 20. The crossover block-off member 12 has the length of between two to twelve inches. The crossover block-off member 12 is between 1½ and 2 inches in diameter. The crossover block-off member slit 16 is between ±½ inch and ¾ inches in width. The crossover block-off member side wall 14 thickness is between 0.020 and 0.070 inches thick. In the present embodiment the device is made of spring steel. In alternate embodiments the device can be comprised of mild, stainless, chrome plated, tool steel, aluminum or titanium.

Figure 2:
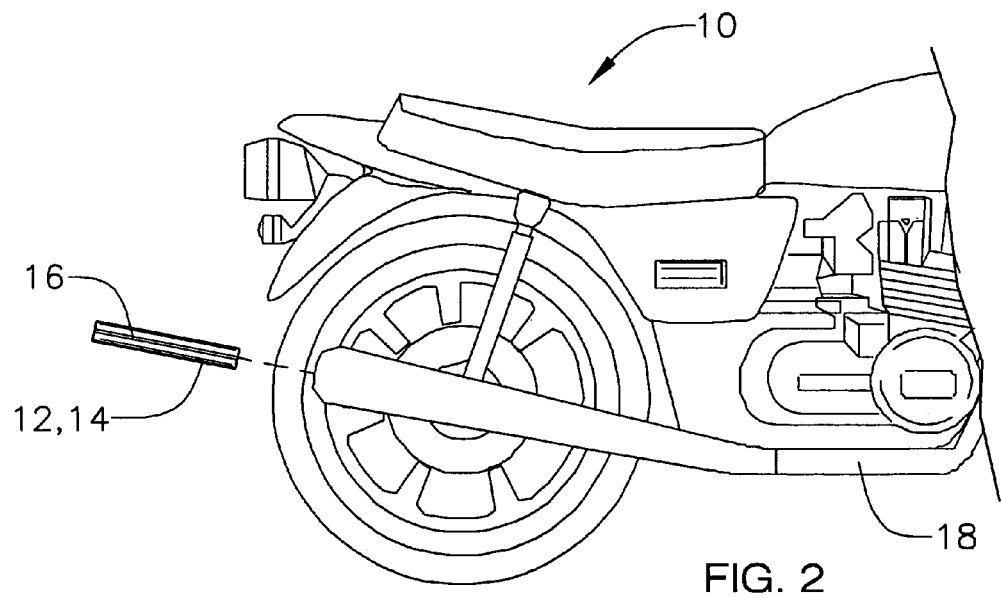
FIG. 2 is a left side view of the motorcycle exhaust control system of the present invention.

In FIG. 2, the motorcycle exhaust control system 10 is illustrated and will be described. More particularly, the motorcycle exhaust control system 10 has the elongate tubular crossover block-off member 12. The crossover block-off member 12 has the side wall 14. The crossover block-off member side wall 14 has the slit 16 extending the length thereof. The crossover block-off member 12 forms the springed structure capable of placement in the motorcycle exhaust pipe 18. The crossover block-off member 12 is capable of self detainment in the motorcycle exhaust pipe 18. The crossover block-off member 12 is capable of blocking the motorcycle exhaust pipe crossover 20. The crossover block-off member 12 has the length of between two to twelve inches. The crossover block-off member 12 is between 1½ and 2 inches in diameter. The crossover block-off member slit 16 is between ½ inch and ¾ inches in width. The crossover block-off member side wall 14 thickness is between 0.020 and 0.070 inches thick.

Figure 3:
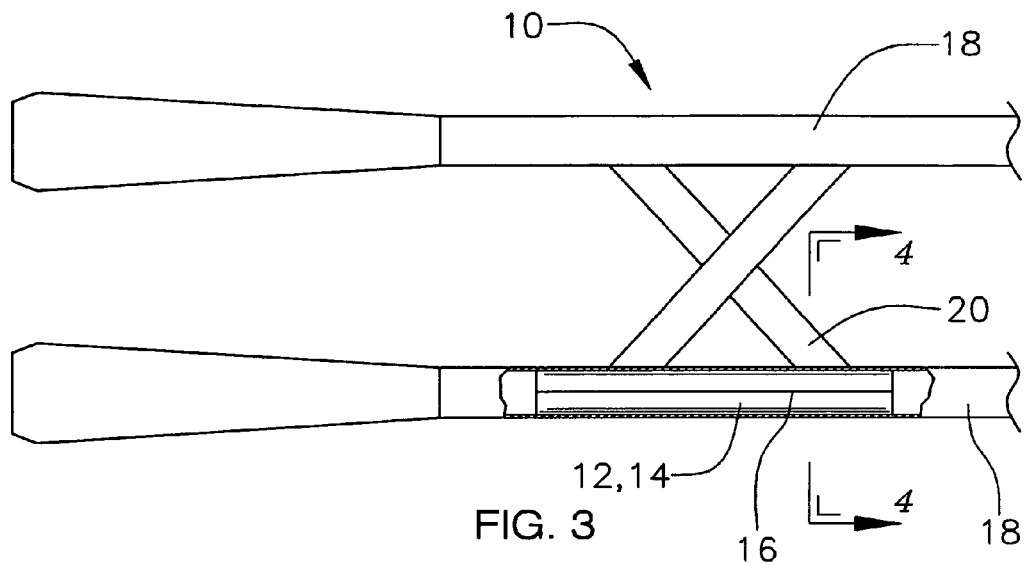
FIG. 3 is a section view of the motorcycle exhaust control system of the present invention.

In FIG. 3, the motorcycle exhaust control system 10 is illustrated and will be described. More particularly, the motorcycle exhaust control system 10 has the elongate tubular crossover block-off member 12. The crossover block-off member 12 has the side wall 14. The crossover block-off member side wall 14 has the slit 16 extending the length thereof. The crossover block-off member 12 forms the springed structure capable of placement in the motorcycle exhaust pipe 18. The crossover block-off member 12 is capable of self detainment in the motorcycle exhaust pipe 18. The crossover block-off member 12 is capable of blocking the motorcycle exhaust pipe crossover 20. The crossover block-off member 12 has the length of between two to twelve inches. The crossover block-off member 12 is between 1½ and 2 inches in diameter. The crossover block-off member slit 16 is between ½ inch and ¾ inches in width. The crossover block-off member side wall 14 thickness is between 0.020 and 0.070 inches thick.

Figure 4:
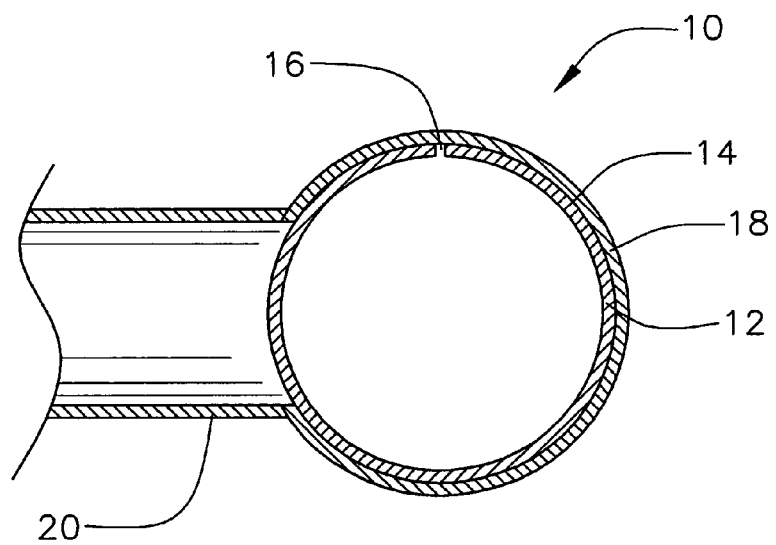
FIG. 4 is a section 4—4 view of FIG. 3 of the motorcycle exhaust control system of the present invention.

In FIG. 4, the motorcycle exhaust control system 10 is illustrated and will be described. More particularly, the motorcycle exhaust control system 10 has the elongate tubular crossover block-off member 12. The crossover block-off member 12 has the side wall 14. The crossover block-off member side wall 14 has the slit 16 extending the length thereof. The crossover block-off member 12 forms the springed structure capable of placement in the motorcycle exhaust pipe 18. The crossover block-off member 12 is capable of self detainment in the motorcycle exhaust pipe 18. The crossover block-off member 12 is capable of blocking the motorcycle exhaust pipe crossover 20. The crossover block-off member 12 has the length of between two to twelve inches. The crossover block-off member 12 is between 1½ and 2 inches in diameter. The crossover block-off member slit 16 is between ½ inch and ¾ inches in width. The crossover block-off member side wall 14 thickness is between 0.020 and 0.070 inches thick.

In use, it can now be understood that the crossover block-off member 12 is placed within the motorcycle exhaust pipe 18 to cover the motorcycle exhaust pipe crossover 20 to increase bottom end torque.

While a preferred embodiment of the motorcycle exhaust control system has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material may be used instead of the steel described. And although springed tubular motorcycle exhaust control system capable of positioning and self detainment in a motorcycle exhaust pipe have been described, it should be appreciated that the motorcycle exhaust control system herein described is also suitable for use as a crossover blocking member for any internal combustion exhaust system.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle exhaust control system comprising:
an elongate tubular crossover block-off member, said crossover block-off member having a side wall, said crossover block-off member side wall having a slit extending the length thereof, said crossover block-off member forming a springed structure for placement in a motorcycle exhaust pipe, said crossover block-off member for self detainment in said motorcycle exhaust pipe, said crossover block-off member for blocking a motorcycle exhaust pipe crossover, said crossover block-off member having a length of between six to twelve inches, said crossover block-off member is between 1½ and 2 inches in diameter, said crossover block-off member slit is between ½ inch and ¾ inches in width, said crossover block-off member side wall thickness is between 0.020 and 0.070 inches thick.

* * * * *